US010466467B2

(12) United States Patent
Chen

(10) Patent No.: US 10,466,467 B2
(45) Date of Patent: Nov. 5, 2019

(54) ELECTRONIC TELESCOPE

(71) Applicant: Quan Xing Electronic Technology (ShenZhen) Co., LTD., Shenzhen, Guangdong (CN)

(72) Inventor: Han-Che Chen, Taipei (TW)

(73) Assignee: QUAN XING ELECTRONIC TECHNOLOGY (SHENZHEN) CO., LTD., Shenzhen, Guangdong (CN)

(*) Notice: Subject to any disclaimer, the term of this patent is extended or adjusted under 35 U.S.C. 154(b) by 122 days.

(21) Appl. No.: 15/723,626

(22) Filed: Oct. 3, 2017

(65) Prior Publication Data
US 2019/0101743 A1    Apr. 4, 2019

(51) Int. Cl.
G02B 23/18    (2006.01)
G02B 25/00    (2006.01)
F21V 19/00    (2006.01)
G02B 7/06    (2006.01)
H04N 5/372    (2011.01)
F21Y 115/10    (2016.01)
F21Y 105/10    (2016.01)

(52) U.S. Cl.
CPC ............ *G02B 23/18* (2013.01); *F21V 19/003* (2013.01); *G02B 7/06* (2013.01); *G02B 25/001* (2013.01); *F21Y 2105/10* (2016.08); *F21Y 2115/10* (2016.08); *H04N 5/372* (2013.01)

(58) Field of Classification Search
CPC ...... G02B 23/00; G02B 23/12; G02B 23/125; G02B 23/18; G02B 7/04; G02B 7/06; G02B 25/001; G02B 27/017–0172; G02B 27/0187; G02B 2027/0132–0138; G02B 13/14; G02B 13/16; F21V 19/003; F21Y 2105/10; F21Y 2115/00; F21Y 2115/10; F21Y 2101/00; H04N 5/372; H04N 5/225; H04N 7/18
USPC .................. 359/363, 400, 630; 348/36, 61
See application file for complete search history.

(56) References Cited

U.S. PATENT DOCUMENTS

| 3,658,412 A | 4/1972 | Seaman |
| 3,922,524 A | 11/1975 | Anderson |
| 4,934,771 A | 6/1990 | Rogers |
| 5,903,337 A | 5/1999 | Hamada |
| D752,670 S * | 3/2016 | Chen ........................ D16/132 |
| 2005/0094250 A1 * | 5/2005 | Dane .................. C21D 10/005 359/334 |

(Continued)

OTHER PUBLICATIONS

Barska, Product Catalog, 2016, included pp. 1, 2, and 87 (Year: 2016).*

(Continued)

*Primary Examiner* — Stephone B Allen
*Assistant Examiner* — Adam W Booher
(74) *Attorney, Agent, or Firm* — Muncy, Geissler, Olds & Lowe, P.C.

(57) ABSTRACT

An electronic telescope is provided, including a main body, a lens module, a display module, and a single eyepiece. The main body includes an objective end and an eyepiece end which is opposite to the objective end. The lens module is disposed on the objective end. The display module connects to the lens module and is configured to display an image captured from the lens module. The single eyepiece lens with a single focus has a longitudinal structure and is disposed on the eyepiece end, wherein the eyepiece lens corresponds to the user's two eyes.

14 Claims, 7 Drawing Sheets

(56) References Cited

U.S. PATENT DOCUMENTS

2009/0058881 A1    3/2009  Ottney
2011/0141223 A1*   6/2011  Choe ..................... G02B 23/00
                                                        348/36

OTHER PUBLICATIONS

Barska NVX100 Night Vision Monocular User Manual, pp. 1-5, accessed online Mar. 26, 2019, https://www.barska.com/media/manuals/Binocular/BQ12388_BC472.pdf (Year: 2019).*
Pfisterer et al. "Dual Reflective Baffle System for the BeCOAT Telescope", SPIE vol. 1994, pp. 112-121 (Year: 1994).*
Sportsman's Guide, Sniper Digital Zoom 2X Deluxe Night Vision Binoculars, Available at least as of Feb. 20, 2017, Accessed online Mar. 26, 2019, https://www.sportsmansguide.com/product/index/sniper-digital-zoom-2x-deluxe-night-vision-binoculars?a=2070097 (Year: 2017).*
X-Vision Night Vision Binocular Deluxe XANB20 User Manual, Apr. 2018 (Year: 2018).*
European Patent Office, Office Action, dated Feb. 4, 2019, 13 pages.

\* cited by examiner

ELECTRONIC TELESCOPE

BACKGROUND OF THE INVENTION

Field of the Invention

The application relates in general to an electronic telescope, and in particular to an electronic telescope that includes a single eyepiece lens.

Description of the Related Art

Thanks to the ongoing development of technology, electronic products such as electronic telescopes/binoculars are becoming increasingly versatile. For example, such devices can be used to watch stage performances, to admire natural scenery, and to aid in hunting, and the possible applications of such electronic telescopes grow as newer models continue to display high performance. Traditional telescopes/binoculars for two eyes usually include two independent eyepiece lenses on the eyepiece end. However, everyone's interpupillary distance is different, so that the traditional telescopes/binoculars must include an adjustment mechanism for fine-tuning the interpupillary distance for each user, which may increase manufacturing costs and make the manufacturing process more complex. Also, it can be inconvenient for the user since the telescope needs to be adjusted prior to each use. Therefore, to provide a good product design which is convenient for the user and easier to manufacture is an important issue.

BRIEF SUMMARY OF INVENTION

To address the deficiencies of conventional electronic telescopes, an embodiment of the invention provides an electronic telescope, including a main body, a lens module, a display module, and a single eyepiece. The main body includes an objective end and an eyepiece end which is opposite to the objective end. The lens module is disposed on the objective end. The display module connects to the lens module and is configured to show an image captured from the lens module. The single eyepiece lens with a single focus has a longitudinal structure and is disposed on the eyepiece end, wherein the eyepiece lens corresponds to the two eyes of the user.

In some embodiments, the eyepiece lens is a convex lens.

In some embodiments, the eyepiece lens has a first side and an opposite second side, the first side is farther away from the display module than the second side is, and the radius of curvature of the eyepiece lens on the first side has a range of 280 mm to 330 mm.

In some embodiments, the radius of curvature of the eyepiece lens on the second side has a range of 100 mm to 150 mm.

In some embodiments, the electronic telescope further comprises a light-emitting diode (LED) assembly, disposed on the objective end and adjacent to the lens module.

In some embodiments, the LED assembly includes a plurality of light-emitting diodes, and the light-emitting diodes are arranged in a matrix.

In some embodiments, the electronic telescope further comprises a circuit board disposed in the main body, wherein the lens module and the LED assembly are disposed on the circuit board, and the length of the lens module is greater than the length of the circuit board in the direction of the central axis of the main body.

In some embodiments, the circuit board connects the lens module to the display, and a charge-coupled device is disposed on the circuit board.

In some embodiments, the main body further has an observation room situated between the objective end and the eyepiece end.

In some embodiments, the observation room has a tapered structure with a first end and a second end respectively corresponding to the objective end and an eyepiece end, and an opening of the observation room is narrower on the first end than on the second end.

In some embodiments, the observation room includes a first inner wall and a second inner wall which are facing each other, and the first and second inner walls extend aslant with respect to a central axis of the main body from the objective end to the eyepiece end.

In some embodiments, the first and the second walls include a plurality of scattering structures.

In some embodiments, the electronic telescope further comprises an adjusting wheel configured to adjust the focus of the lens module, and the adjusting wheel is disposed on the bottom of the main body.

In some embodiments, the main body further has two receiving spaces disposed on the bottom of the main body, configured to receive a non-rechargeable battery and a rechargeable battery, respectively.

In some embodiments, the upper surface of the main body has a plurality of protrusions.

In some embodiments, the electronic telescope further comprises an eyeshield disposed on the eyepiece end, wherein the length of the eyeshield in the long axis direction is at least 30 mm longer than the length of the eyepiece lens.

BRIEF DESCRIPTION OF DRAWINGS

The invention can be more fully understood by reading the subsequent detailed description and examples with references made to the accompanying drawings, wherein:

FIGS. 4A-4B are schematic diagrams of the single eyepiece lens in FIG. 3, wherein FIG. 4B is a cross-sectional view taken along the line B'-B' in FIG. 4A.

DETAILED DESCRIPTION OF INVENTION

The making and using of the embodiments of the electronic telescopes are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
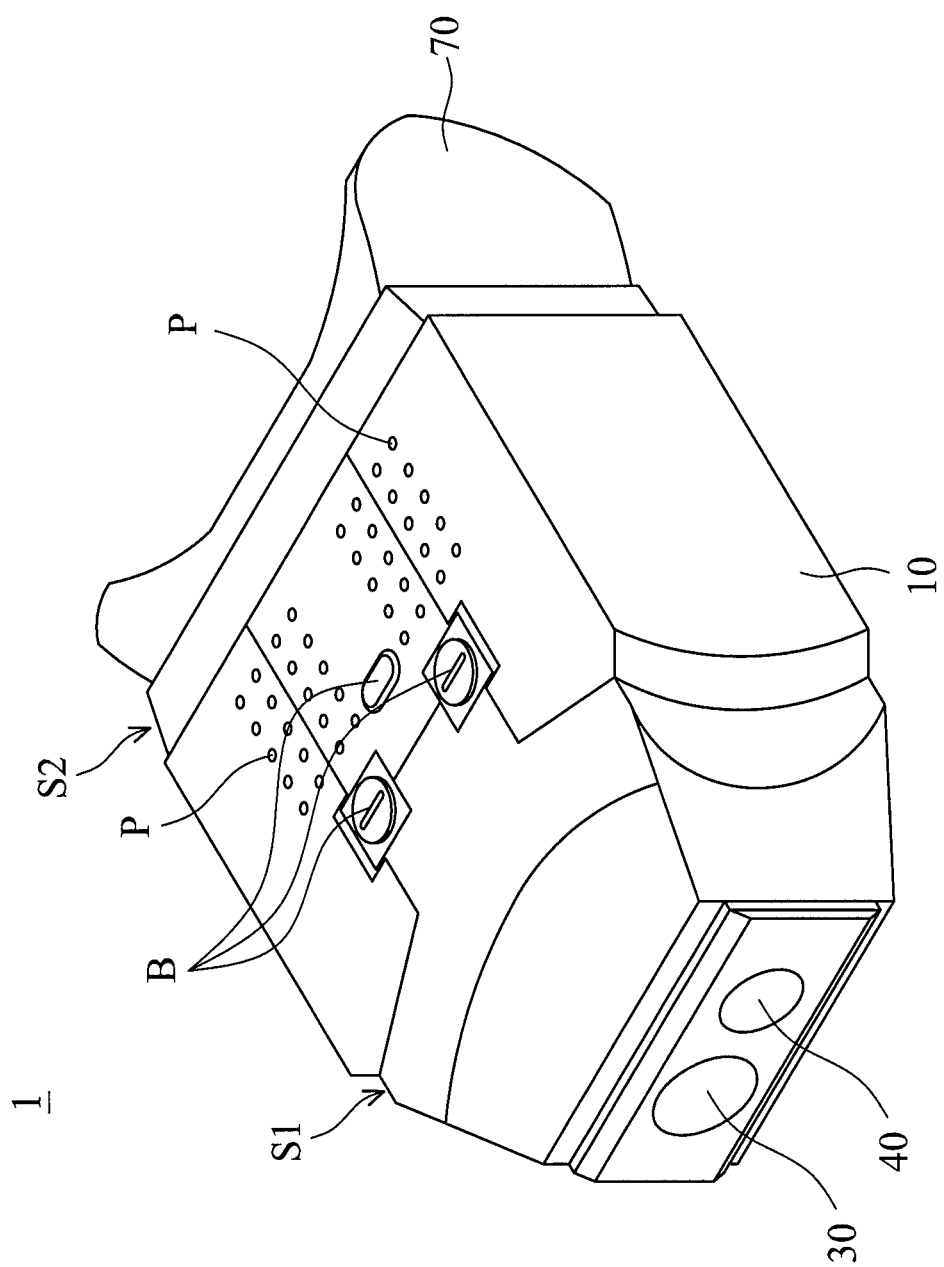
FIG. 1 is a schematic diagram of an electronic telescope according to an embodiment of the invention.
Figure 2:
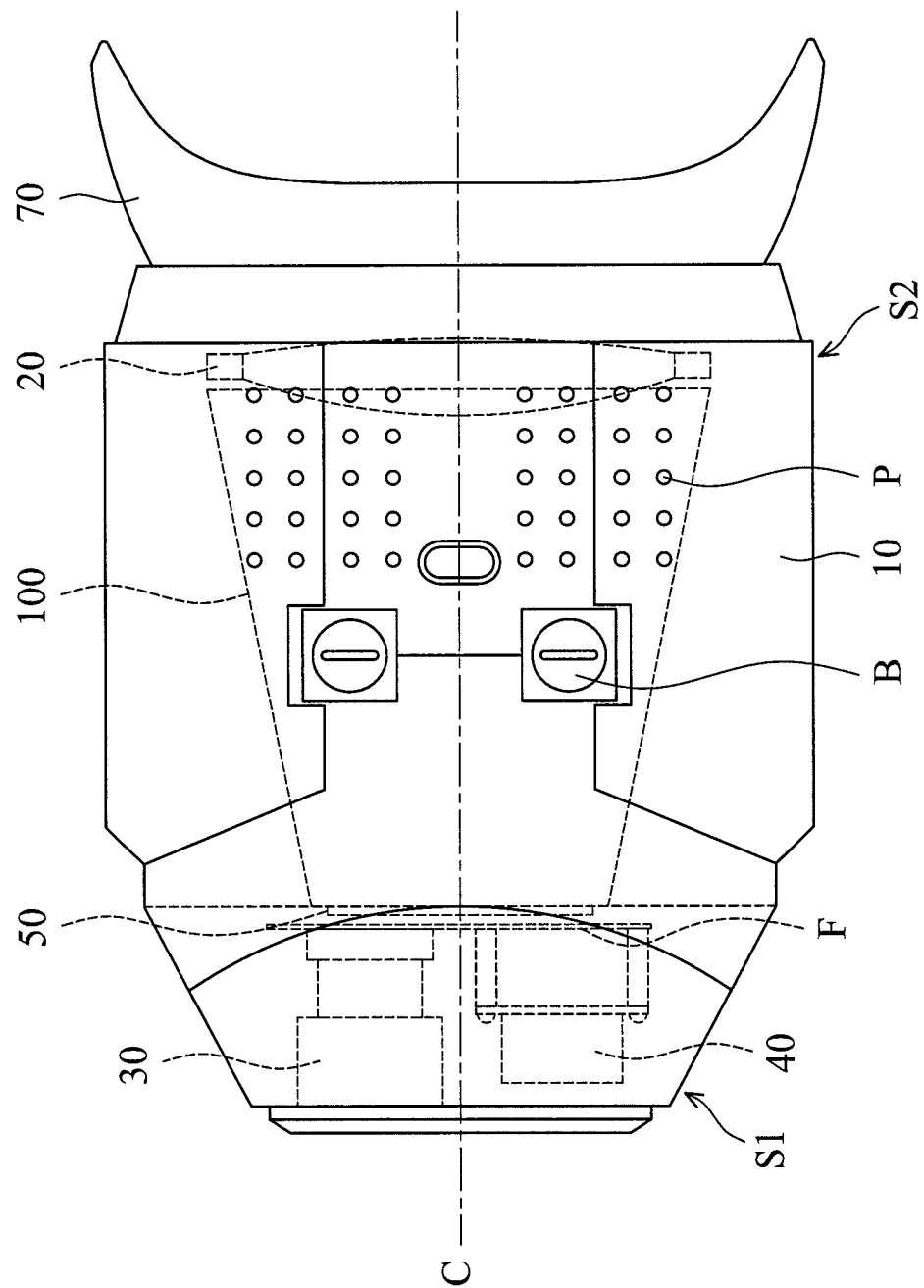
FIG. 2 is a top view perspective diagram of the electronic telescope in FIG. 1.

FIG. 1 is a schematic diagram of an electronic telescope 1 according to an embodiment of the invention, and FIG. 2 is a top view diagram of the electronic telescope 1. As shown in FIGS. 1-2, the electronic telescope 1, for example, may be a night version telescope, primarily comprising a main body 10, a single eyepiece lens 20, a lens module 30, a light-emitting diode (LED) assembly 40, and a display module 50. The main body 10 includes an objective end S1 and an eyepiece end S2 which are opposite each other. The lens module 30 and the LED assembly 40 are disposed on the objective end S1, and the eyepiece lens 20 is disposed on the eyepiece end S2. Furthermore, the display module 50 is disposed in the main body 10, and a circuit board F (such as a flexible printed circuit board (FPCB), and a charge-coupled device (CCD) may be disposed thereon) connects and is between the lens module 30 and the display module 50. It should be noted that the eyepiece lens 20 (please see FIGS. 2 and 3) is a one-piece eyepiece lens with one focus (single focus) corresponding to the two eyes of a user, and the user may see an image on the display module 50 captured from the lens module 30 through the eyepiece lens 20.

Figure 3:
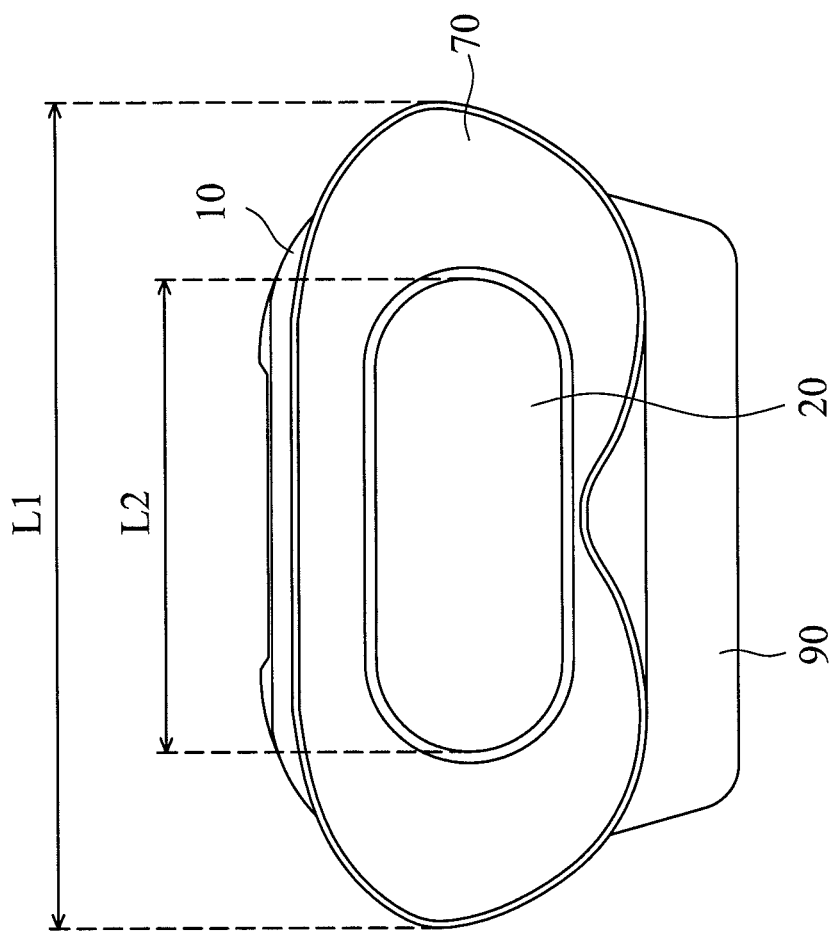
FIG. 3 is a rear-view diagram of the electronic telescope in FIG. 1.

FIG. 3 is a rear-view diagram illustrating the electronic telescope 1 in FIG. 1. The eyepiece lens 20 has a longitudinal structure and a large area which can fully cover both of the user's eyes, so that it can easily correspond to the eyes of any user. Compared to traditional electronic telescopes/binoculars for two eyes with two independent eyepiece lenses that correspond to two eyes, in the present embodiment, there is no need to adjust the interpupillary distance to accommodate each unique user because the eyepiece lens 20 is a one-piece eyepiece lens with a large covering area. Thus, the electronic telescope 1 is convenient for any user to use (without having to adjust interpupillary distance), and additional components such as adjustment mechanisms for interpupillary distance can be eliminated, simplifying the manufacturing processes and lowering the production cost.

Figure 4A:
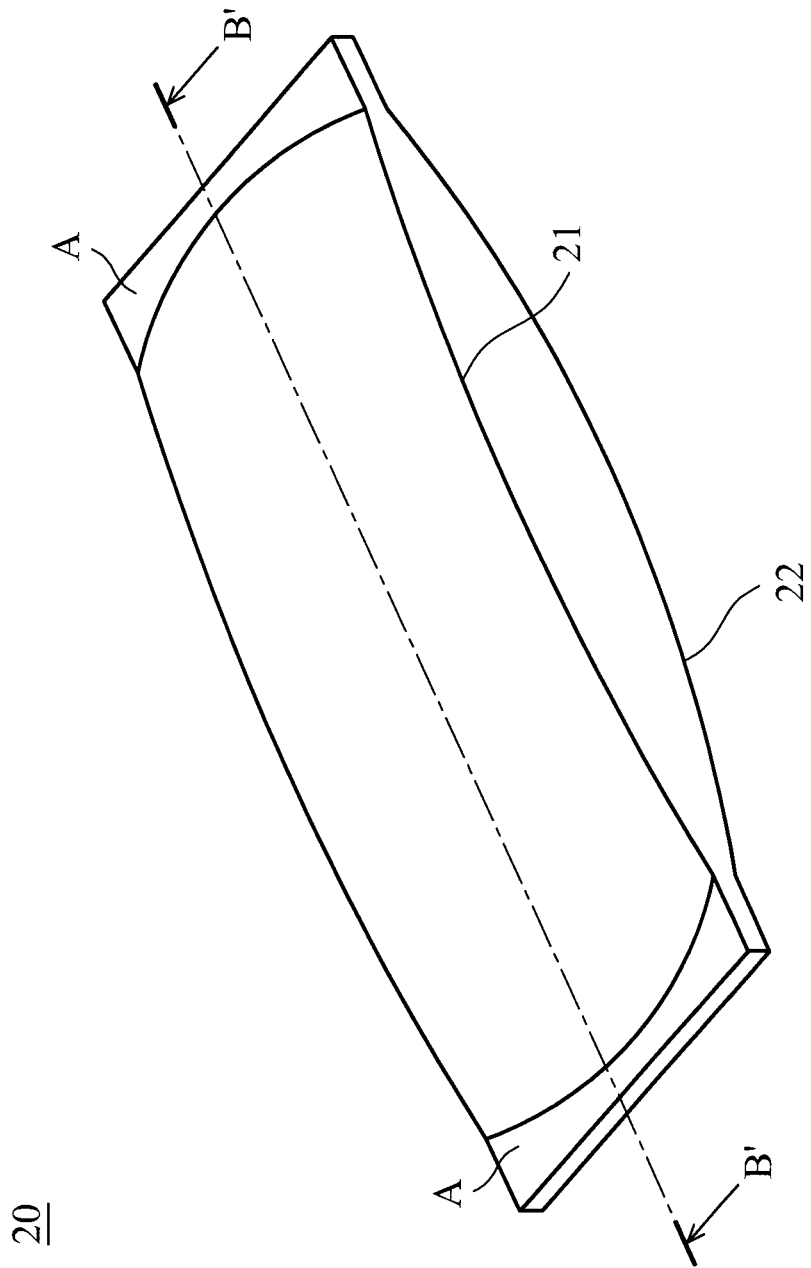
Figure 4B:
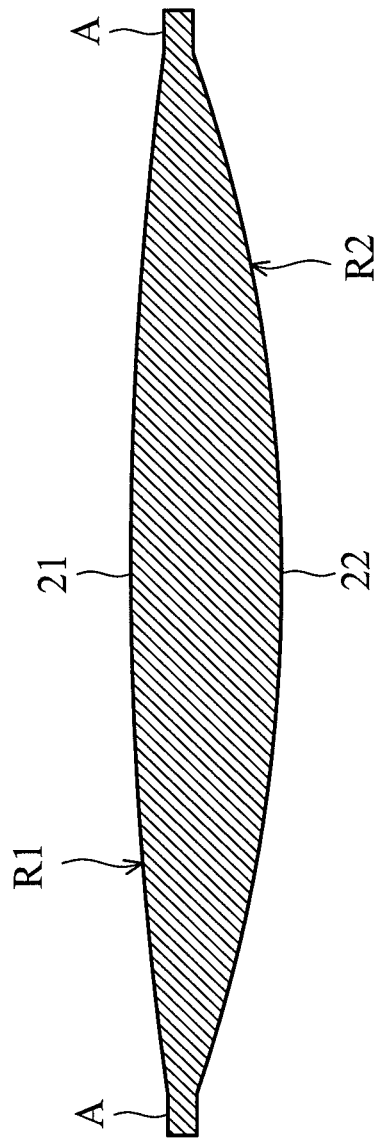

FIGS. 4A and 4B are schematic diagrams of the eyepiece lens 20 in FIG. 3. The eyepiece lens 20, which may be a convex lens, has a first side 21 and an opposite second side 22. The first side 21 is farther away from the display module 50 than the second side 22 is (that is, the first side 21 is closer to the eyes of the user when the electronic telescope 1 is being used). In the present embodiment, the radius of curvature R1 of the eyepiece lens on the first side 21 has a range of 280 mm to 330 mm; in a preferred embodiment, the radius of curvature R1 is 307 mm. In the present embodiment, the radius of curvature R2 of the eyepiece lens on the second side 22 has a range of 100 mm to 150 mm; in a preferred embodiment, the radius of curvature R2 is 122 mm. In a preferred embodiment, the difference (difference in value) between the radius of curvature R1 and the radius of curvature R2 is 160 to 210 mm.

As shown in FIGS. 2-3, the electronic telescope 1 also comprises an eyeshield 70 disposed on the eyepiece end S2 of the main body 10. The eyeshield 70 is disposed around the eyepiece lens 20 and covers a portion of the eyepiece lens 20 (see FIG. 4A; the areas A) for attachment or assembly. Moreover, the eyeshield 70 may be made of a silicone material, to enhance comfort, and the length L1 in the long axis direction of the eyeshield 70 is at least 30 mm longer than the length L2 of the exposed eyepiece lens 20 (that is, the lens not covered by the eyeshield 70). Moreover, a plurality of protrusions P are formed on the upper surface of the main body 10. When using the electronic telescope 1, a user's hands can touch these protrusions P to stably hold the electronic telescope 1, to improve the use of stability and comfort.

Please refer to FIG. 1 again. The light-emitting diode (LED) assembly 40 is also disposed on the objective end S1 and adjacent to the lens module 30. The LED assembly 40, for example, is an infrared light LED (IR LED) unit, and may include one or more light-emitting diodes, which can emit infrared light. When used at night, the user may press a button B or buttons B so that the LED assembly 40 runs and provides illumination to assist the lens module 30 to capture an image. In some embodiments, the LED assembly 40 with a plurality of light-emitting diodes may be arranged in a matrix (for example, a 3×3 or a 3×4 matrix). In addition, as shown in FIG. 2, the lens module 30 and the LED assembly 40 are disposed on the circuit board F, and the length of the lens module 30 is greater than the length of the LED assembly 40 in the direction of the central axis C of the main body 10 (see FIG. 2; the lens module 30 is closer to the end of electronic telescope 1 than the LED assembly 40).

Figure 5:
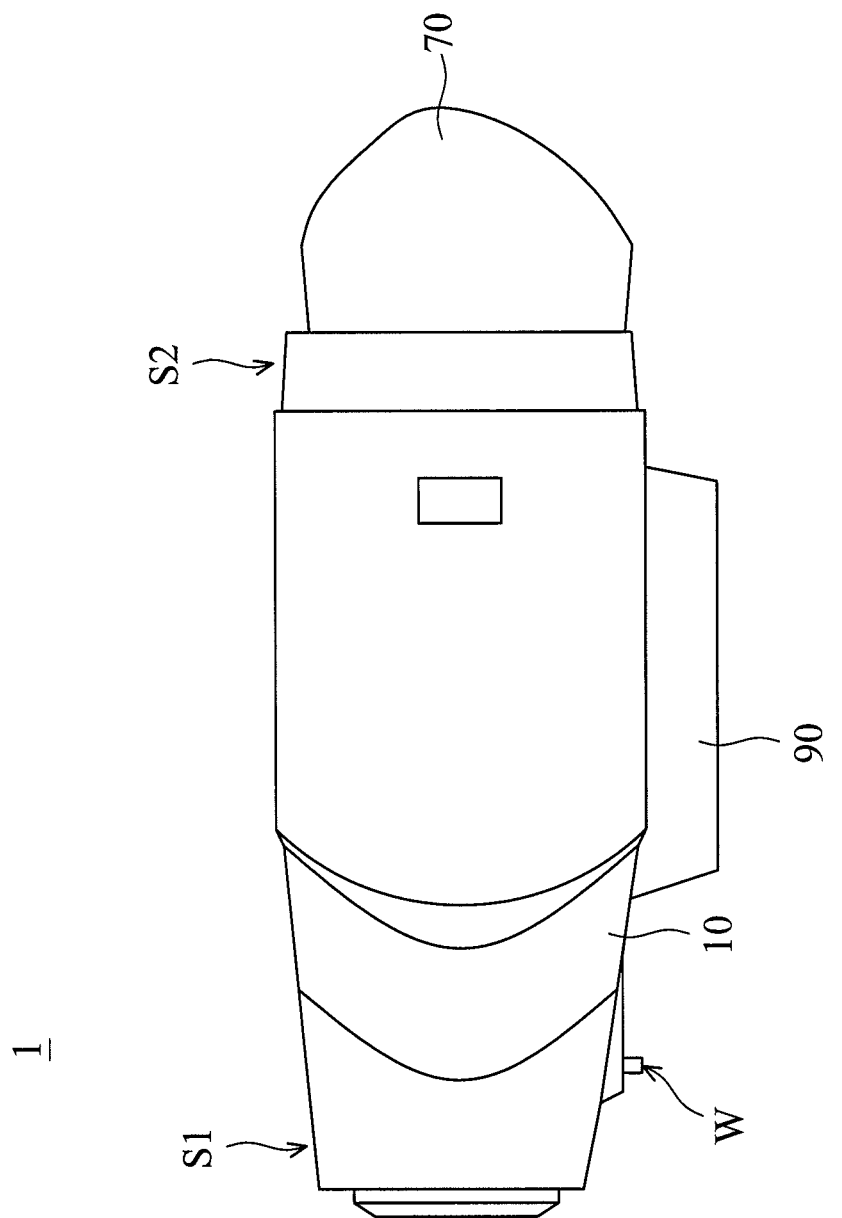
FIG. 5 is a lateral side-view diagram of the electronic telescope in FIG. 1.

FIG. 5 is a lateral side-view diagram of the electronic telescope 1. As shown in FIG. 5, an adjusting wheel W is formed on the bottom of the main body 10, and is configured to adjust the focus of the lens module 30 to perform optical zoom. It should be noted that the adjusting wheel W is situated on the bottom of the main body 10 so that the user can easily operate it to adjust the focal length of the lens module 30.

Continuing refer to FIG. 5, a receiving space 90 is also disposed on the bottom of the main body 10 configured to receive a battery. In some embodiments, there are two independent receiving spaces formed on the bottom of the main body 10, configured to receive a non-rechargeable battery and the primary battery (a rechargeable battery), respectively. Thus, with the appropriate circuit, it is convenient for a user to power the electronic telescope 1 with rechargeable batteries or a primary battery.

Figure 6:
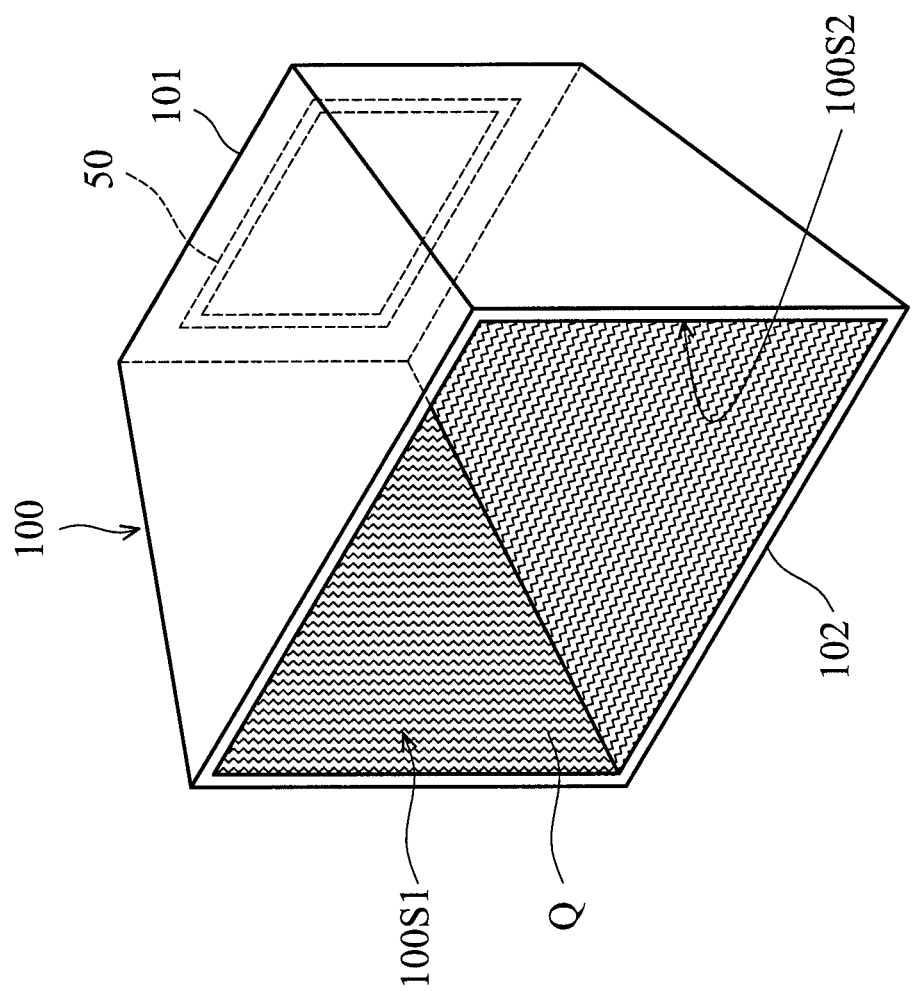
FIG. 6 is a schematic diagram of the observation room 100 and the display module 50 in FIG. 2.

FIG. 6 is a schematic diagram of the observation room 100 of the main body 10 and the display module 50 of the electronic telescope 1. The observation room 100 is disposed between the objective end S1 and the eyepiece end S2 (FIG. 2) and has a tapered structure. As shown in FIG. 6, the tapered structure has a first end 101 and a second end 102 respectively corresponding to the objective end S1 and an eyepiece end S2, and the opening of the observation room 100 is narrower on the first end 101 than on the second end 102. In the present embodiment, a user can see the image on the display module 50 through the observation room 100 which provides a comfortable viewing effect for the user.

More specifically, the observation room 100 includes a first inner wall 100S1 and a second inner wall 100S2 which are facing each other, and the first and second inner walls 100S1 and 100S2 extend aslant (with respect to the central axis C of the main body 10) from the objective S1 end to the eyepiece end S2. Moreover, the first and second inner walls 100S1 and 100S2 are formed with a plurality of scattering structures Q. The scattering structures Q (which may be wave-shaped) can scatter (or reflect) the oblique light scattered (or reflected) from the display module 50, to provide a good visual experience for the user.

In summary, an electronic telescope is provided, primarily including a main body, a lens module, a display module, and a single eyepiece. The main body includes an objective end and an eyepiece end which is opposite the objective end. The lens module is disposed on the objective end. The display module connects to the lens module and is configured to display an image captured by the lens module. The single eyepiece lens with a single focus has a longitudinal structure and is disposed on the eyepiece end, wherein the eyepiece lens corresponds to the two eyes of the user. Therefore, it is convenient to use the electronic telescope since the larger single eyepiece lens with a single focus corresponds to the two eyes of the user, rather than using two independent eyepiece lenses, on which each user needs to adjust the interpupillary distance. Moreover, other adjustment mechanisms can be eliminated, reducing the cost of production and assembly. In addition, the electronic telescope includes a light-emitting diode assembly so that the electronic telescope has a night vision function for use at night. Furthermore, the visual comfort and effect are enhanced via a taper-shaped observation room of the main body when watching the image on the display module.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An electronic telescope, comprising:
   a main body, including an objective end and an eyepiece end which is opposite to the objective end;
   a lens module disposed on the objective end;
   a display module, connected to the lens module and configured to display an image captured from the lens module; and
   a single eyepiece lens with a single focus, which has a longitudinal structure and is disposed on the eyepiece end, wherein the eyepiece lens corresponds to a user's two eyes;
   wherein the main body further has an observation room situated between the objective end and the eyepiece end, and the observation room has a tapered structure with a first end and a second end respectively corresponding to the objective end and an eyepiece end,
   wherein an opening of the tapered structure of the observation room is narrower on the first end than on the second end, and the display module is disposed on the first end.

2. The electronic telescope as claimed in claim 1, wherein the eyepiece lens is a convex lens.

3. The electronic telescope as claimed in claim 1, wherein the eyepiece lens has a first side and an opposite second side, the first side is farther away from display module than the second side, and a radius of curvature of the eyepiece lens on the first side has a range of 280 mm to 330 mm.

4. The electronic telescope as claimed in claim 3, wherein a radius of curvature of the eyepiece lens on the second side has a range of 100 mm to 150 mm.

5. The electronic telescope as claimed in claim 1, further comprising a light-emitting diode (LED) assembly, disposed on the objective end and adjacent to the lens module.

6. The electronic telescope as claimed in claim 5, wherein the LED assembly includes a plurality of light-emitting diodes, and the light-emitting diodes are arranged in a matrix.

7. The electronic telescope as claimed in claim 6, wherein a circuit board connects the lens module and the display, and a charge-coupled device is disposed on the circuit board.

8. The electronic telescope as claimed in claim 5, further comprising a circuit board disposed in the main body, wherein the lens module and the LED assembly are disposed on the circuit board, and the length of the lens module is greater than the length of the circuit board in a direction of the central axis of the main body.

9. The electronic telescope as claimed in claim 1, wherein the observation room includes a first inner wall and a second inner wall which are facing each other, and the first and second inner walls extend aslant with respect to a central axis of the main body from the objective end to the eyepiece end.

10. The electronic telescope as claimed in claim 9, wherein the first and the second walls include a plurality of scattering structures.

11. The electronic telescope as claimed in claim 1, further comprising an adjusting wheel configured to adjust a focus of the lens module, and the adjusting wheel is disposed on a bottom of the main body.

12. The electronic telescope as claimed in claim 1, wherein the main body further has two receiving spaces disposed on a bottom of the main body, configured to receive a non-rechargeable battery and a rechargeable battery, respectively.

13. The electronic telescope as claimed in claim 1, wherein an upper surface of the main body has a plurality of protrusions.

14. The electronic telescope as claimed in claim 1, further comprising an eyeshield disposed on the eyepiece end, wherein a length of the eyeshield in a long axis direction is at least 30 mm longer than a length of the eyepiece lens.

* * * * *

(12) EX PARTE REEXAMINATION CERTIFICATE (11990th)
United States Patent
Chen

(10) Number: US 10,466,467 C1
(45) Certificate Issued: Jan. 27, 2022

(54) ELECTRONIC TELESCOPE

(71) Applicant: Quan Xing Electronic Technology (ShenZhen) Co., LTD., Guangdong (CN)

(72) Inventor: Han-Che Chen, Taipei (TW)

(73) Assignee: QUAN XING ELECTRONIC TECHNOLOGY (SHENZHEN) CO., LTD., Guangdong (CN)

Reexamination Request:
No. 90/014,443, Jan. 31, 2020

Reexamination Certificate for:
Patent No.: 10,466,467
Issued: Nov. 5, 2019
Appl. No.: 15/723,626
Filed: Oct. 3, 2017

(51) Int. Cl.
G02B 23/18 (2006.01)
F21V 19/00 (2006.01)
G02B 7/06 (2021.01)
G02B 25/00 (2006.01)
F21Y 105/10 (2016.01)
H04N 5/372 (2011.01)
F21Y 115/10 (2016.01)

(52) U.S. Cl.
CPC ............ *G02B 23/18* (2013.01); *F21V 19/003* (2013.01); *G02B 7/06* (2013.01); *G02B 25/001* (2013.01); *F21Y 2105/10* (2016.08); *F21Y 2115/10* (2016.08); *H04N 5/372* (2013.01)

(58) Field of Classification Search
None
See application file for complete search history.

(56) References Cited

To view the complete listing of prior art documents cited during the proceeding for Reexamination Control Number 90/014,443, please refer to the USPTO's public Patent Application Information Retrieval (PAIR) system under the Display References tab.

*Primary Examiner* — Glenn K Dawson

(57) ABSTRACT

An electronic telescope is provided, including a main body, a lens module, a display module, and a single eyepiece. The main body includes an objective end and an eyepiece end which is opposite to the objective end. The lens module is disposed on the objective end. The display module connects to the lens module and is configured to display an image captured from the lens module. The single eyepiece lens with a single focus has a longitudinal structure and is disposed on the eyepiece end, wherein the eyepiece lens corresponds to the user's two eyes.

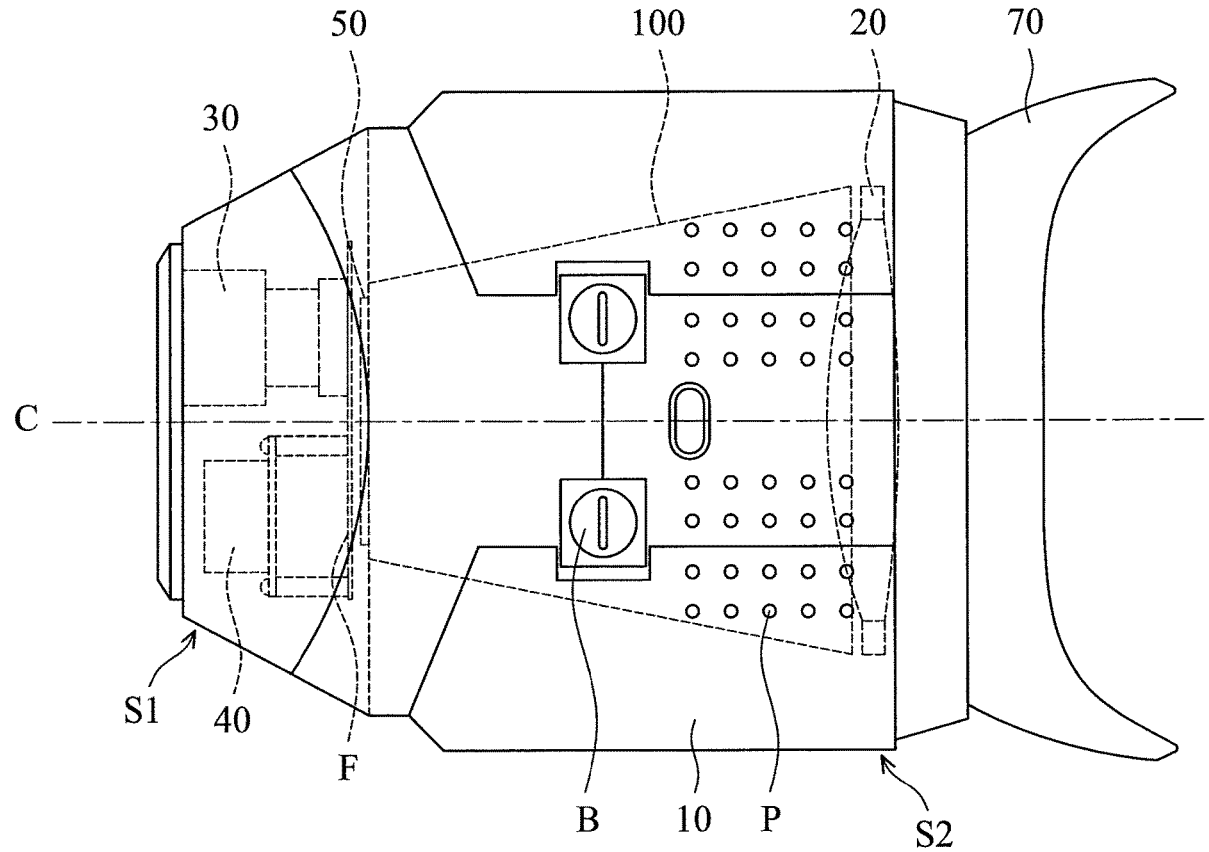

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 and 8-14 are cancelled.

Claim 7 is determined to be patentable as amended.

7. [The] *An* electronic telescope [as claimed in claim 6], *comprising:*
   *a main body, including an objective end and an eyepiece end which is opposite to the objective end;*
   *a lens module disposed on the objective end;*
   *a display module, connected to the lens module and configured to display an image captured from the lens module; and*
   *a single eyepiece lens with a single focus, which has a longitudinal structure and is disposed on the eyepiece end, wherein the eyepiece lens corresponds to a user's two eyes;*
   *wherein the main body further has an observation room situated between the objective end and the eyepiece end, and the observation room has a tapered structure with a first end and a second end respectively corresponding to the objective end and an eyepiece end,*
   *wherein an opening of the tapered structure of the observation room is narrower on the first end than on the second end, and the display module is disposed on the first end, and*
   *wherein the single eyepiece lens is a biconvex lens having a first convex surface and an opposite second convex surface, and the second convex surface is closer to the display module than the first convex surface; and*
   *further comprising a light-emitting diode (LED) assembly, disposed on the objective end and adjacent to the lens module; and*
   *wherein the LED assembly includes a plurality of light-emitting diodes, and the light-emitting diodes are arranged in a matrix; and*
   wherein a circuit board connects the lens module and the display, and a charge-coupled device is disposed on the circuit board.

\* \* \* \* \*